(12) United States Patent
Lee et al.

(10) Patent No.: US 8,024,547 B2
(45) Date of Patent: Sep. 20, 2011

(54) VIRTUAL MEMORY TRANSLATION WITH PRE-FETCH PREDICTION

(75) Inventors: Keith Lee, San Jose, CA (US); Frido Garritsen, Hayward, CA (US)

(73) Assignee: Vivante Corporation, Sunnyvale, CA (US)

( * ) Notice: Subject to any disclaimer, the term of this patent is extended or adjusted under 35 U.S.C. 154(b) by 170 days.

(21) Appl. No.: 11/799,762

(22) Filed: May 1, 2007

(65) Prior Publication Data

US 2008/0276066 A1    Nov. 6, 2008

(51) Int. Cl.
*G06F 12/00* (2006.01)
(52) U.S. Cl. ......... 711/213; 711/137; 711/205; 711/207
(58) Field of Classification Search .................. 711/204, 711/206, 213, 137, 205, 207
See application file for complete search history.

(56) References Cited

U.S. PATENT DOCUMENTS

| | | | | |
|---|---|---|---|---|
| 5,499,326 A | * | 3/1996 | Narayanaswami | 345/619 |
| 5,822,788 A | * | 10/1998 | Kahn et al. | 711/213 |
| 5,966,142 A | * | 10/1999 | Harkin | 345/522 |
| 6,230,260 B1 | * | 5/2001 | Luick | 712/239 |
| 6,628,294 B1 | * | 9/2003 | Sadowsky et al. | 345/568 |
| 6,747,653 B2 | * | 6/2004 | Doyle | 345/501 |
| 2004/0193830 A1 | * | 9/2004 | Haren et al. | 711/202 |
| 2008/0028181 A1 | * | 1/2008 | Tong et al. | 711/207 |
| 2008/0192057 A1 | * | 8/2008 | Prokopenko et al. | 345/441 |

OTHER PUBLICATIONS

S. VanderWiel, and D. Lilja. "Data prefetch mechanisms", In ACM Computing Surveys, 2000.*
D. Joseph and D. Grunwald. "Prefetching using Markov predictors", in International Symposiumn on Computer Archietecture (ISCA), 1990.*

* cited by examiner

*Primary Examiner* — Matthew Bradley
(74) *Attorney, Agent, or Firm* — Stevens Law Group; David R. Stevens (57) ABSTRACT

A system to facilitate virtual page translation. An embodiment of the system includes a processing device, a front end unit, and address translation logic. The processing device is configured to process data of a current block of data. The front end unit is coupled to the processing device. The front end unit is configured to access the current block of data in an electronic memory device and to send the current block of data to the processor for processing. The address translation logic is coupled to the front end unit and the electronic memory device. The address translation logic is configured to pre-fetch a virtual address translation for a predicted virtual address based on a virtual address of the current block of data. Embodiments of the system increase address translation performance of computer systems including graphic rendering operations.

23 Claims, 8 Drawing Sheets

VIRTUAL MEMORY TRANSLATION WITH PRE-FETCH PREDICTION

BACKGROUND OF THE INVENTION

Many types of computer system use virtual memory. The use of virtual memory allows a computer to reference data stored in auxiliary storage as though it were resident in main memory. Another benefit of using virtual memory is the ability to reference contiguous virtual memory addresses which correlate to non-contiguous physical memory addresses. In order to correlate the virtual memory addresses to physical memory addresses, a virtual address translation is performed.

The virtual memory address translation is typically performed by referencing a translation table (often referred to as a translation lookaside buffer, or TLB) which caches recently used virtual address translations. If the translation table does not have the requested physical memory address for the virtual memory address, then the translation is fetched from memory (e.g., from a page table stored in main memory). A fetched address translation is then stored in the translation table. The requestor is held off until the requested translation is available in the translation table.

In conventional computer systems, virtual address translation is performed on demand because the non-contiguous use of physical memory accesses is inherently unpredictable. In other words, a conventional design for a memory management unit (MMU) does not attempt to predict virtual address translations because the non-contiguous nature of physical addressing makes it difficult and, hence, very costly to try to predict virtual address translations with any degree of accuracy.

SUMMARY OF THE INVENTION

Embodiments of a system are described. In one embodiment, the system is a system to facilitate virtual page translation. An embodiment of the system includes a processing device, a front end unit, and address translation logic. The processing device is configured to process data of a current block of data. The front end unit is coupled to the processing device. The front end unit is configured to access the current block of data in an electronic memory device and to send the current block of data to the processor for processing. The address translation logic is coupled to the front end unit and the electronic memory device. The address translation logic is configured to pre-fetch a virtual address translation for a predicted virtual address based on a virtual address of the current block of data. Embodiments of the system increase address translation performance of computer systems including computer graphics systems. Other embodiments of the system are also described.

Embodiments of a method are also described. In one embodiment, the method is a method for pre-fetch prediction in connection with virtual page translation. An embodiment of the method includes receiving a command to process data within a current block of data. The command includes a virtual address associated with the current block of data. The method also includes accessing the current block of data in an electronic memory device. The method also includes pre-fetching a virtual address translation for a predicted virtual address based on the virtual address of the current block of data. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
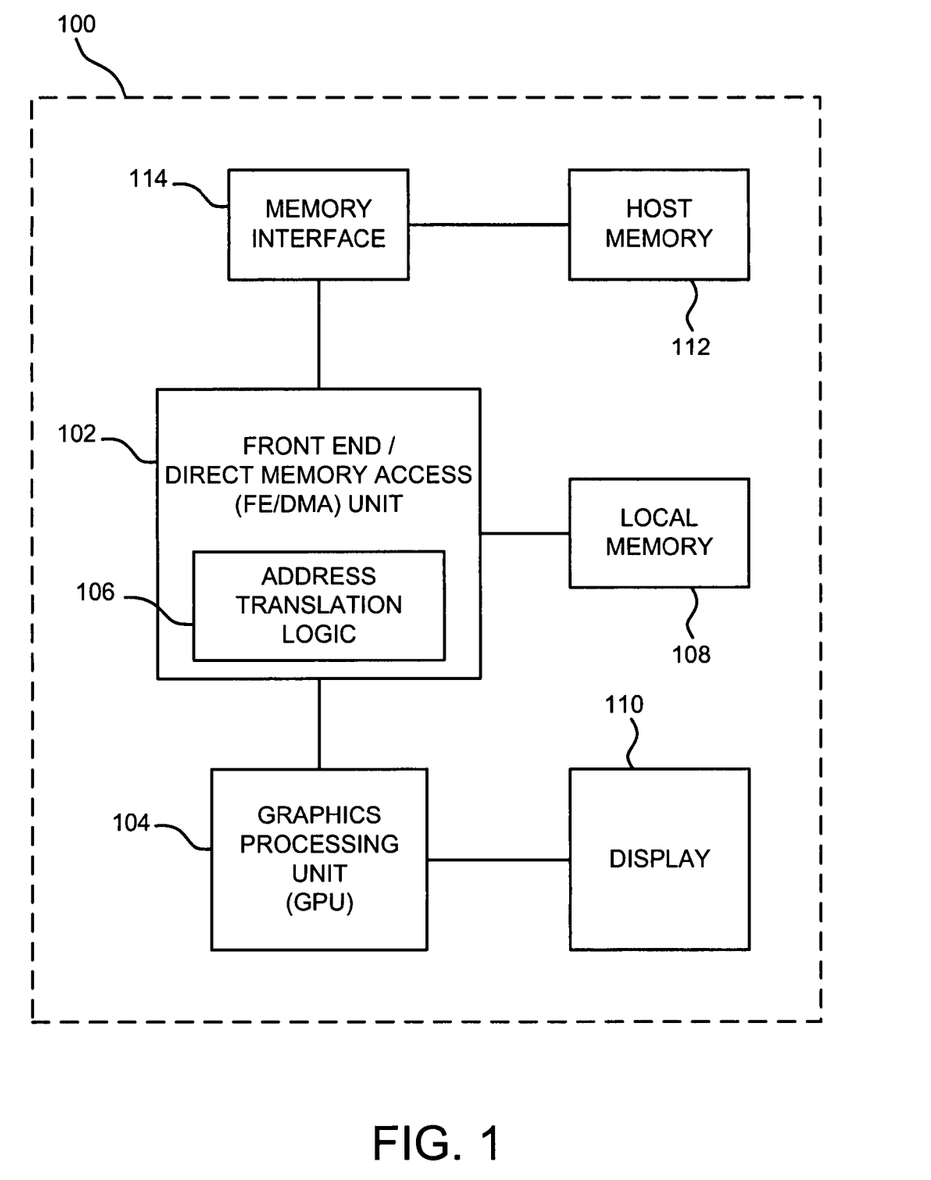
FIG. 1 depicts a schematic block diagram of one embodiment of a computer graphics system.

FIG. 1 depicts a schematic block diagram of one embodiment of a computer graphics system 100. The illustrated computer graphics system 100 includes a front end/direct memory access (FE/DMA) unit 102 and a graphics processing unit (GPU) 104. The FE/DMA unit 102 includes address translation logic 106. The computer graphics system 100 also includes an electronic memory device 108 coupled to the FE/DMA unit 102, and a display device 110 coupled to the GPU 104. Additionally, the FE/DMA unit 102 is coupled to a host memory device 112 via a memory interface 114. Although the illustrated computer graphics system 100 shows certain component parts, other embodiments of the computer graphics system 100 may include fewer or more component parts.

In general, the computer graphics system 100 is configured to model objects and to display the modeled objects on the display device 110. Objects are often modeled with polygons such as triangles having three vertices and three edges, or sides, connecting the three vertices. An object can be modeled with a single triangle, or it can be modeled with thousands, or millions, of triangles. To model an object, the computer graphics system 100 may store and reference the vertices of each triangle. Additional details are provided below in regard to the storage and processing of object vertices.

In one embodiment, the FE/DMA unit 102 controls the input traffic of command streams and the various DMA vertex streams feeding the graphics pipeline. The FE/DMA unit 102 also interfaces to the local memory device 108 to pull in various streams of vertices. Alternatively, the memory device 108 may be integrated with the FE/DMA unit 102. Once the streams of vertices are pulled in, the FE/DMA unit 102 assembles and formats the streams into one vertex stream. Additionally, the FE/DMA unit 102 does the element assembly for inputting the vertex into a vertex shader (not shown). In one embodiment, the FE/DMA unit 102 also includes a buffer (refer to the description of FIG. 2) that can be configured as a vertex cache or a stream assembly first-in first-out (FIFO) buffer. The output of the cache or stream assembly buffer couples to a format/conversion unit (not shown), which assembles the various elements for the vertex shader. Since vertex shaders are known in the art, further details of the functionality of the vertex shader are not described herein.

Figure 2:
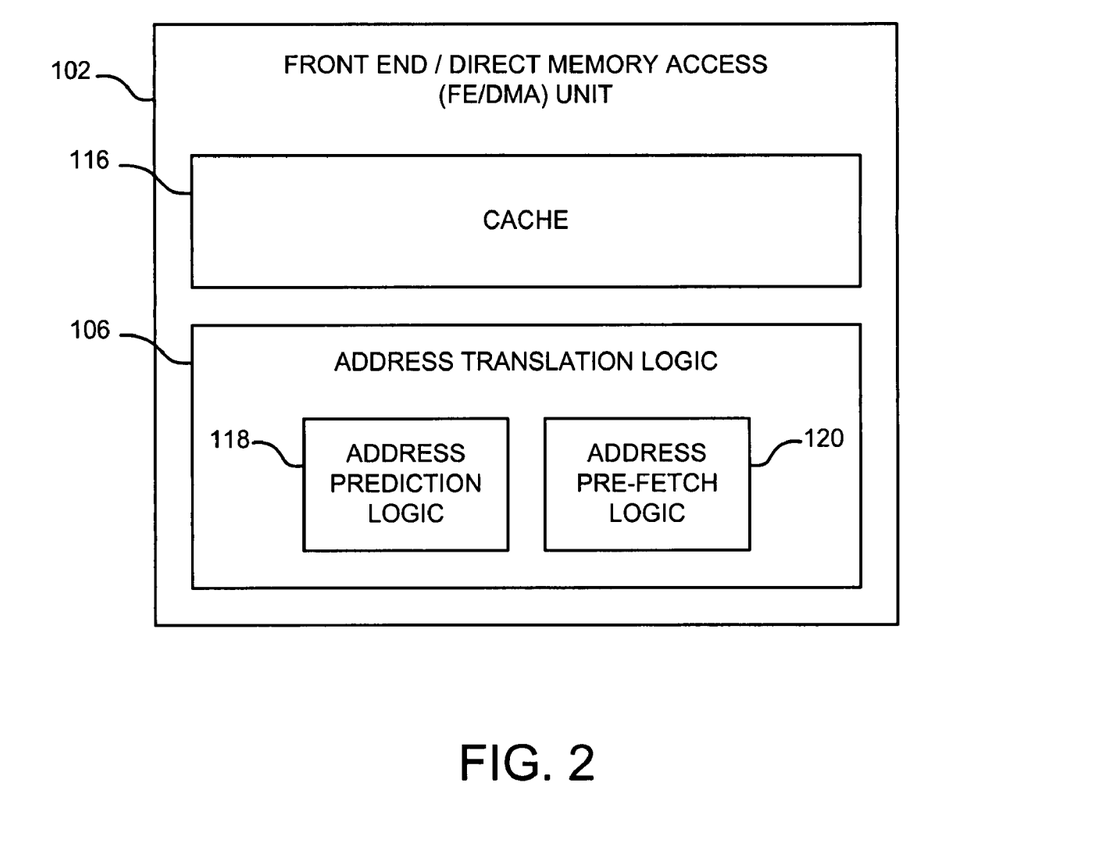
FIG. 2 depicts a schematic block diagram of one embodiment of the FE/DMA unit of the computer graphics system of FIG. 1.

FIG. 2 depicts a schematic block diagram of one embodiment of the FE/DMA unit 102 of the computer graphics system 100 of FIG. 1. The illustrated FE/DMA unit 102 includes the address translation logic 106 and a cache (or buffer) 116. In one embodiment, the cache 116 stores vertices for processing by the GPU 104 and representation on the display device 110.

The address translation logic 106 includes address prediction logic 118 and address pre-fetch logic 120. Other embodiments of the address translation logic 106 may include fewer or more logic blocks than are shown in FIG. 2. In one embodiment, the address translation logic 106 invokes the address prediction logic 118 and/or the address pre-fetch logic 120 to pre-fetch a virtual address translation for a predicted virtual address based on a virtual address of a current block of data.

In particular, the address prediction logic 118 is configured to predict the predicted virtual address based on a type of operation processed by a processor such as the GPU 104. Exemplary types of operations include draw primitive and draw index primitive operations. Another exemplary operation is a memory copy, or move, operation.

Depending on the type of operation, the address prediction logic 118 predicts a next sequential virtual address as the predicted virtual address based on a next block of data after the current block of data. This is referred to as forward address prediction because the predicted address is a subsequent physical address. Alternatively, the address prediction logic 118 predicts a previous sequential virtual address as the predicted virtual address based on a previous block of data before the current block of data. This is referred to as reverse address prediction because the predicted address is a previous physical address.

In one embodiment, the address pre-fetch logic 120 is configured to pre-fetch the virtual address translation from an address translation source. An example of an address translation source is a translation lookaside buffer (TLB). Another example of an address translation source is an auxiliary storage device such as the host memory 112 of the computer graphics system 100 of FIG. 1.

The address pre-fetch logic 120 is also configured to pre-fetch the virtual address translation approximately simultaneously with a virtual-to-physical address translation for the current block of data. In one embodiment, the address translation logic 106 issues a single address translation request to fetch the virtual-to-physical address translation for a current block of data and to pre-fetch a virtual address translation for a predicted virtual address. Alternatively, the address translation logic 106 may issue separate address translation commands to fetch the virtual-to-physical address translation for the current block of data and to pre-fetch a virtual address translation for the predicted virtual address. In some embodiments, the address translation logic 106 may issue one or more commands to pre-fetch a plurality of virtual address translations at approximately the same time. The plurality of virtual address translations correspond to a plurality of predicted virtual addresses. The predicted virtual addresses are based on the virtual address of the current block of data. In one embodiment, the pre-fetched virtual address translations for the predicted virtual addresses are stored in the cache 116.

Figure 3:
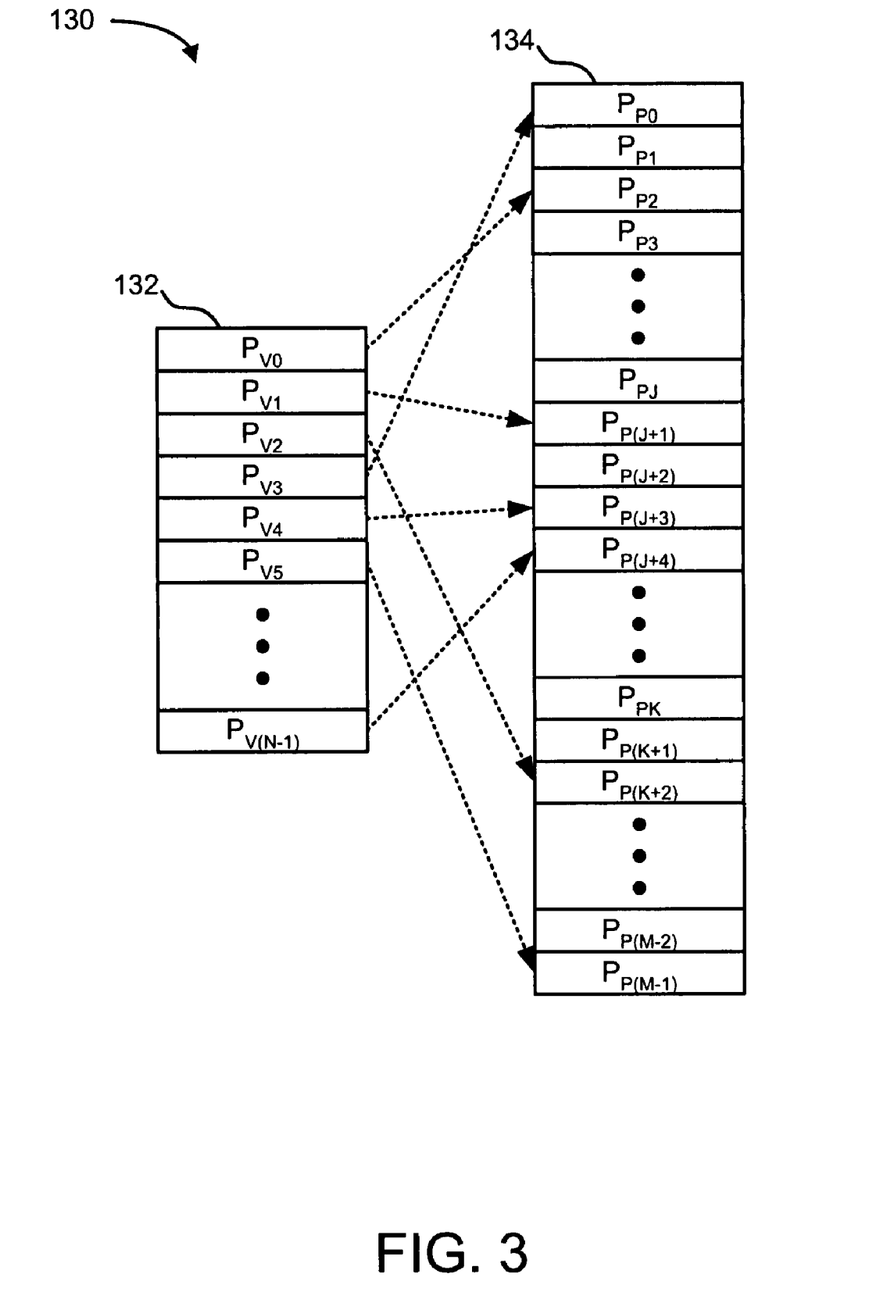
FIG. 3 depicts a schematic diagram of one embodiment of virtual-to-physical memory address mapping.

FIG. 3 depicts a schematic diagram of one embodiment of virtual-to-physical memory address mapping 130. For convenience, the virtual and physical memory blocks are referred to as pages. In one embodiment, a page is about 4 KB in size. However, other embodiments may use other sizes of blocks or chunks, of memory other than conventional pages. Also, as a matter of convention used herein, virtual memory address pages, or blocks, are designated as "$P_V$" and physical memory address pages, or blocks, are designated as "$P_P$."

The illustrated virtual-to-physical memory address mapping 130 shows a plurality of virtual pages 132 identified as $P_{V0}$ through $P_{V(N-1)}$. In one embodiment, these virtual pages 132 reside in main memory 108. Each of these virtual pages 132 has a corresponding virtual memory address. The illustrated virtual-to-physical memory address mapping 130 also shows a plurality of physical pages 134 identified as $P_{P0}$ through $P_{P(M-1)}$. In one embodiment, these physical pages 134 reside in the host memory 112. Each of these physical pages 134 has a corresponding physical memory address.

It can be seen from FIG. 3 that the contiguous virtual pages 132 correlate to non-contiguous physical pages 134. For example, the virtual page $P_{V0}$ corresponds to the physical page $P_{P2}$, the virtual page $P_{V1}$ corresponds to the physical page $P_{P(J+1)}$, and the virtual page $P_{V2}$ corresponds to the physical page $P_{P(K+2)}$. For a virtual-to-physical memory address mapping 130 that exhibits this type of non-contiguous mapping scheme such as conventional memory mapping, effective address translation prediction and pre-fetching may be extremely difficult to implement. Additionally, the cost of such implementation, if possible, may be prohibitive. However, for a virtual-to-physical memory address mapping which exhibits a more contiguous mapping scheme, it may be useful to implement address translation prediction and pre-fetching. The computer graphics system 100 is an example of a system that uses a more contiguous mapping scheme for at least some of the virtual and physical memory addresses. Also, it may be possible to implement an address translation prediction and pre-fetching system which is cost-effective.

Figure 4:
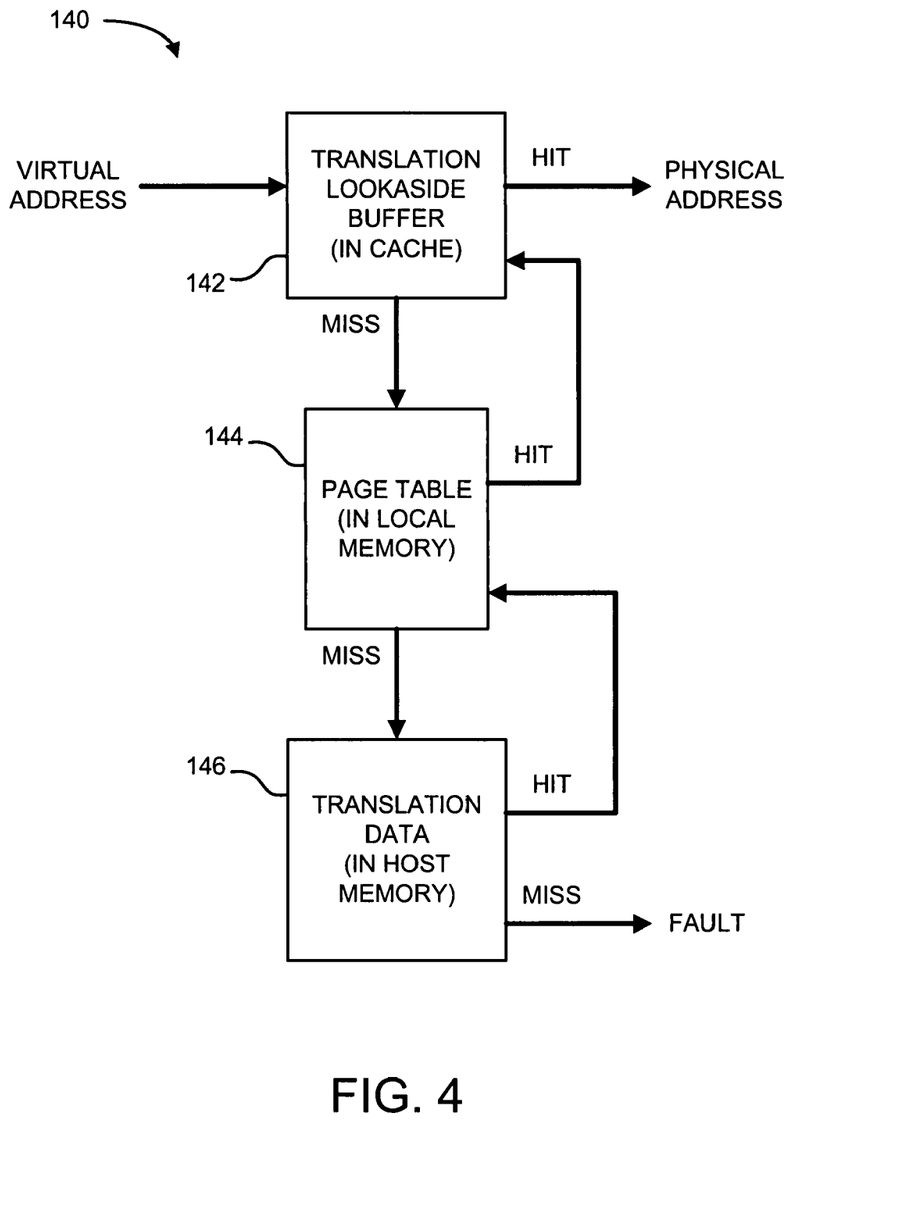
FIG. 4 depicts a schematic block diagram of one embodiment of a virtual-to-physical translation architecture.

FIG. 4 depicts a schematic block diagram of one embodiment of a virtual-to-physical translation architecture 140. In one embodiment, the virtual-to-physical translation architecture 140 is used to translate a virtual memory address to a physical memory address. The illustrated virtual-to-physical translation architecture 140 includes a translation lookaside buffer (TLB) 142, a page table 144, and translation data 146. In one embodiment, the TLB 142 receives a virtual memory address. If an entry in the TLB 142 corresponds to the virtual memory address, then the TLB 142 outputs the corresponding physical memory address to which the virtual memory address is mapped. Otherwise, if the TLB 142 does not include the requested virtual-to-physical translation, then the TLB 142 requests the translation from a page table 144 stored, for example, in the local memory 108. If the page table 144 includes the requested translation, then the TLB 142 stores the translation and outputs the corresponding physical memory address. If the page table 144 does not include the requested translation, then the page table accesses translation data 146 stored, for example, in the host memory 112. If successful, the page table 144 returns the requested data to the TLB 142 which outputs the corresponding physical memory address. Otherwise, the depicted virtual-to-physical translation architecture 140 generates a fault. Other embodiments may perform more or less operations to translate the virtual memory address to a physical memory address.

Figure 5:
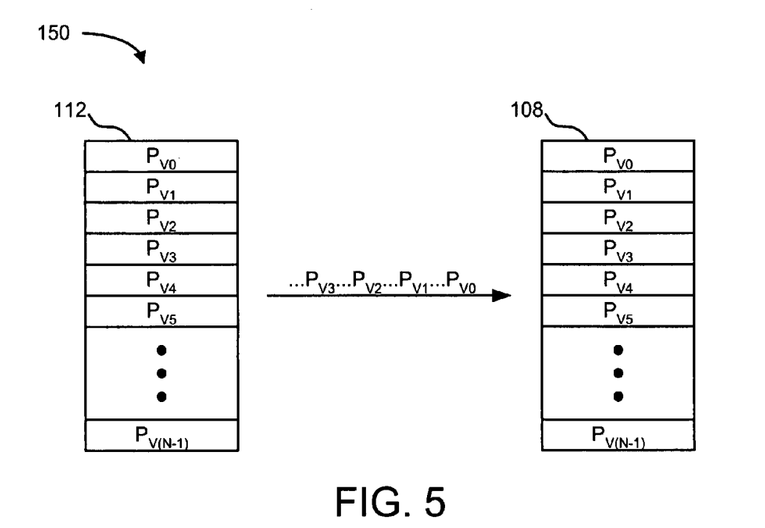
FIG. 5 depicts a schematic diagram of one embodiment of a memory copy operation to move virtual pages from the host memory to the local memory.

FIG. 5 depicts a schematic diagram of one embodiment of a memory copy operation 150 to move virtual pages 132 from the host memory 112 to the local memory 108. This type of operation is also referred to as a move operation. The arrow between the host memory 112 and the local memory 108 shows the virtual pages 132 are moved from the host memory 112 to the local memory 108. The order of the memory copy address stream (i.e., the order in which the virtual pages are moved) is designated by the page identifiers adjacent to the arrow. In particular, the first virtual page 132 moved from the host memory 112 to the local memory 108 is virtual page $P_{V0}$, followed by virtual pages $P_{V1}$, $P_{V2}$, $P_{V3}$, and so on.

In order to implement the memory copy operation 150, the address translation logic 106 may predict and pre-fetch subsequent virtual-to-physical address translations. For example, the address translation logic 106 may translate the virtual memory address corresponding to virtual page $P_{V0}$ and, at approximately the same time, predict and pre-fetch the virtual address translation for virtual page $P_{V1}$. In another embodiment, the address translation logic 106 may predict and pre-fetch multiple virtual address translations at the same time.

Figure 6:
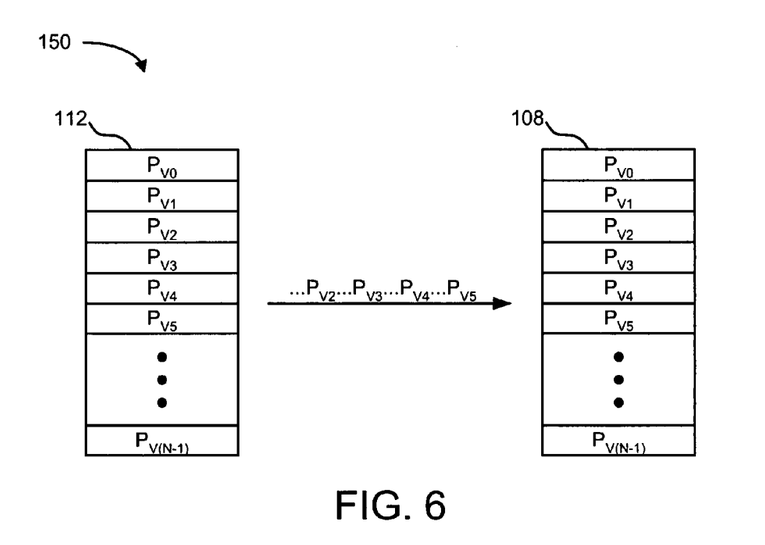
FIG. 6 depicts a schematic diagram of another embodiment of the memory copy operation.

FIG. 6 depicts a schematic diagram of another embodiment of the memory copy operation 150. In particular, the memory copy operation 150 shown in FIG. 6 copies the virtual pages 132 from the host memory 112 to the local memory 108 in reverse order. In other words, the first virtual page 132 moved from the host memory 112 to the local memory 108 is virtual page $P_{V5}$, followed by virtual pages $P_{V4}$, $P_{V3}$, $P_{V2}$, and so on.

In order to implement the memory copy operation 150 of FIG. 6, the address translation logic 106 may predict and pre-fetch subsequent virtual-to-physical address translations. For example, the address translation logic 106 may translate the virtual memory address corresponding to virtual page $P_{V5}$ and, at approximately the same time, predict and pre-fetch the virtual address translation for virtual page $P_{V4}$. In another embodiment, the address translation logic 106 may predict and pre-fetch multiple virtual address translations at the same time.

Figure 7:
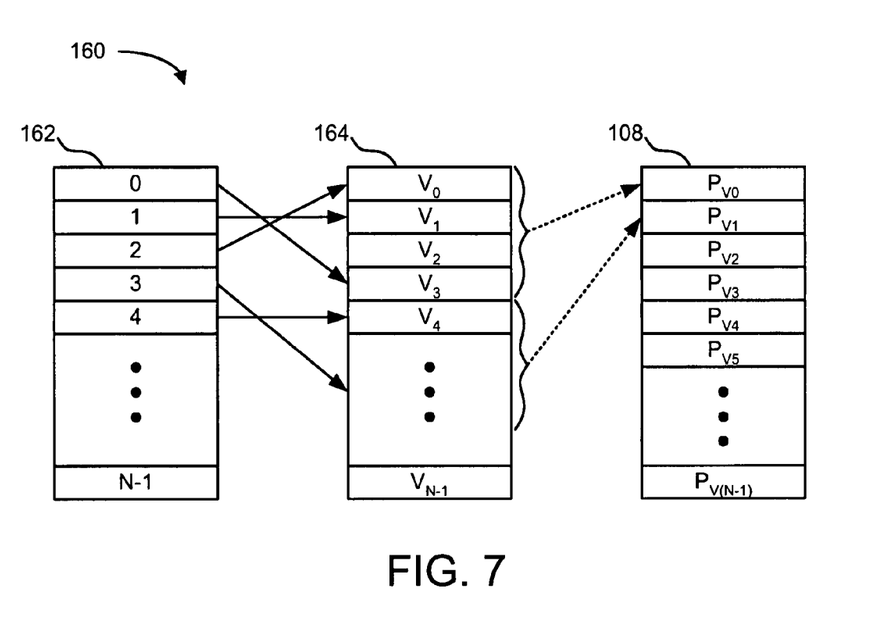
FIG. 7 depicts a schematic diagram of one embodiment of a vertex buffer architecture.

FIG. 7 depicts a schematic diagram of one embodiment of a vertex buffer architecture 160. The illustrated vertex buffer architecture 160 includes an index buffer 162, a vertex buffer 164, and the local memory 108. In one embodiment, the index buffer 162 and the vertex buffer 164 are actually stored in the local memory 108.

The vertex buffer 164 contains a collection of vertices that represent a portion of an object, a complete object, or multiple objects. The index buffer 162 is used when the computer graphics system 100 operates in the index mode, for example, to implement a draw index primitive command. When the computer graphics system 100 operates in the vertex mode, for example, to implement a draw primitive command, the index buffer 162 may be omitted or, alternatively, disregarded.

As an example of the operation of the computer graphics system 100 in vertex mode, a draw primitive command may be issued to draw two triangles. In order to draw the two requested triangles, the FE/DMA unit 102 reads the vertices in order from the vertex buffer 164. Each consecutive set of three vertices represents a triangle. So the first triangle would include vertices $V_0$, $V_1$, and $V_2$. The second triangle would include vertices V3, V4 and V5. As a further example, the vertices $V_0$-$V_5$ may be given the following coordinates:

| VERTEX | COORDINATES |
|---|---|
| $V_0$ | (−1, −1) |
| $V_1$ | (−1, 1) |
| $V_2$ | (1, 1) |
| $V_3$ | (1, −1) |
| $V_4$ | (−1, −1) |
| $V_5$ | (1, 1) |

Using this list of coordinates for the vertices $V_0$-$V_5$ in the vertex mode, the first triangle would include the vertices (−1, −1), (−1, 1), and (1, 1). The second triangle would include the vertices (1, −1), (−1, −1), and (1, 1). It should be noted that implementations of the vertex mode may be duplicative because certain vertices are duplicated in the vertex buffer 164. For example, the coordinates for vertices $V_0$ and $V_4$ are the same, and the coordinates for $V_2$ and $V_5$ are the same.

In general, objects are modeled with triangle mesh or triangle strips. Consequently, many triangles share the same vertex. In one embodiment, the computer graphics system 100 is designed to take advantage of this by rendering triangles that are close together with the same vertex. Using the on chip cache 116, the same vertex can be used multiple times to save memory bandwidth and vertex processing. Hence, in the index mode, indices from the index buffer 162 may be used to point to the corresponding vertices in the vertex buffer 164, instead of using the vertices in the vertex buffer 164 directly. In this way, the duplicative coordinates for $V_4$ and $V_5$ can be omitted from the vertex buffer 164. In order to draw the same triangles previously referred to by vertices $V_0$-$V_5$, the index buffer 162 may simply reference vertices $V_0$-$V_3$, since vertices $V_4$ and $V_5$ are duplicative of vertices $V_0$ and $V_2$. As an example, the index buffer 162 and the vertex buffer 164 may include the following:

| INDEX | VERTEX | COORDINATES |
|---|---|---|
| 0 | $V_0$ | (−1, −1) |
| 1 | $V_1$ | (−1, 1) |
| 2 | $V_2$ | (1, 1) |
| 3 | $V_3$ | (1, −1) |
| 4 | $V_0$ | (−1, −1) |
| 5 | $V_2$ | (1, 1) |

As a matter of nomenclature, it may be helpful to distinguish between the tags used to individually index the index buffer 162 and the vertex buffer 164 from the content stored within the index buffer 162 and the vertex buffer 164. In one embodiment, the tags 0-N may be used with the index buffer 162 to refer to particular entries within the index buffer 162. The actual content of the index buffer 162 may simply be pointers to the tags used to index the vertex buffer 164. In other words, the index tag 0 may reference element 0 within the index buffer 162, which stores vertex tag $V_0$ to reference to the vertex buffer 164. Similarly, the vertex tags $V_0$-$V_{N-1}$ may be used with the vertex buffer 164 to refer to particular entries within the vertex buffer 164, while the actual content of the vertex buffer 164 includes the specific coordinates. In other words, the tag $V_0$ references the first element within the vertex buffer 164, which stores, for example, coordinates (−1, −1). Other embodiments may be implemented and other nomenclatures may be used instead of, or in addition to, the embodiments and nomenclature described herein.

The illustrated vertex buffer architecture 160 also shows that multiple vertices 164 may be stored in a single virtual page 132 (or block) in the local memory 108. For example, the vertices $V_0$-$V_3$ are stored in the virtual page $P_{V0}$, and multiple vertices starting with the vertex $V_4$ are stored in the virtual page $P_{V1}$. Hence, in at least one embodiment, the vertices are stored in order in contiguous virtual pages 132. Additionally, in some embodiments, the contiguous virtual pages 132 are mapped to contiguous physical pages 134.

Figure 8:
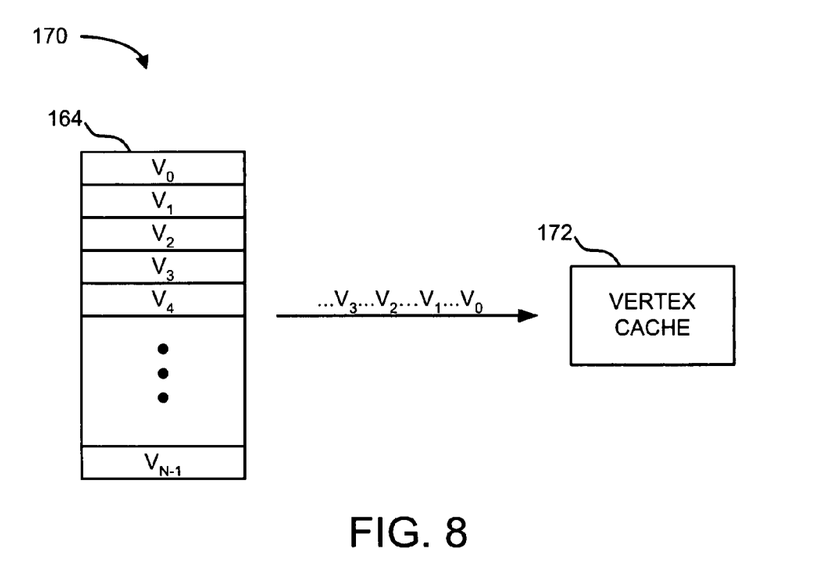
FIG. 8 depicts a schematic diagram of one embodiment of a vertex cache architecture.

FIG. 8 depicts a schematic diagram of one embodiment of a vertex cache architecture 170. In one embodiment, the cache 116 of the FE/DMA unit 102 implements a vertex cache 172 to store the vertices corresponding to one or more graphical commands. The vertex stream shown adjacent to the arrow indicates that the vertices may be read into the vertex cache 172 in the same order that they are stored in the vertex buffer 164, i.e., $V_0$, $V_1$, $V_2$, and so on. If the vertices are located in contiguous virtual pages 132 in the local memory 108, and the virtual pages 132 correspond to contiguous physical pages 134 in the host memory 112, then the vertex stream 170 corresponds to the contiguous physical pages 134 in the host memory 112. Hence, the virtual-to-physical address translations may proceed in a sequential manner, and the address prediction logic 118 and the address pre-fetch logic 120 may predict and pre-fetch virtual address translations in a sequential manner with relatively high effectiveness.

The vertex cache 172 facilitates faster access to at least some of the vertex data stored in the vertex buffer 164. In particular, the vertex cache 172 may store some or all of the vertices for a specific drawing command. Each command corresponds to one object. In general, the properties of an object do not vary within object itself. Hence, all of the vertices used to model the object typically have the same number of elements, and the elements have the same size. For example, a drawing command for an object may include 8 vertices. Each vertex may include 16 elements. Each element may be 16 bytes in size. Therefore, each of the 8 vertices may have a size of 256 bytes, and the object may have a total size of about 2,048 bytes. Other objects may use a different number of vertices, a different number of elements per vertex, or a different element size.

Figure 9:
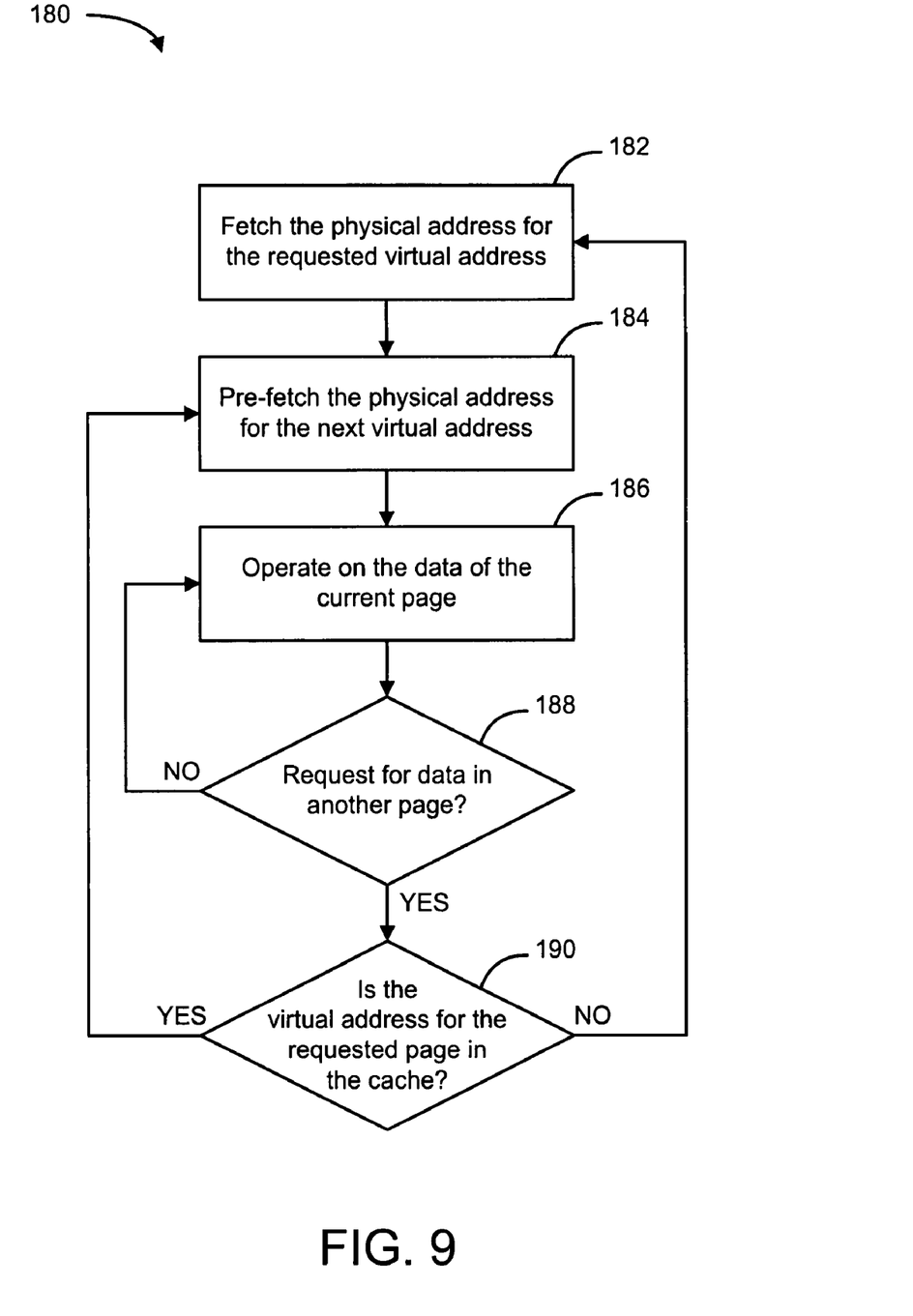
FIG. 9 depicts a schematic flow chart diagram of one embodiment of a pre-fetch prediction method for virtual memory address translations.

FIG. 9 depicts a schematic flow chart diagram of one embodiment of a pre-fetch prediction method 180 for virtual memory address translations. Some embodiments of the pre-fetch prediction method 180 may be implemented in conjunction with the computer graphics system 100 of FIG. 1. Other embodiments of the pre-fetch prediction method 180 may be implemented in conjunction with other types of computer graphics systems.

In the illustrated pre-fetch prediction method 180, the address translation logic 106 fetches 182 the physical address corresponding to a requested virtual address. In one embodiment, this operation is implemented using the virtual-to-physical translation architecture 140 of FIG. 4.

At approximately the same time, or shortly after the address translation logic 106 fetches 182 the virtual-to-physical address translation, the address pre-fetch logic 120 pre-fetches 184 the physical address for a predicted virtual address. In one embodiment, the address prediction logic 118 predicts the predicted virtual address. Depending on the type of drawing command implemented, the address prediction logic 118 may predict a previous address or a subsequent address as the predicted virtual address.

The computer graphics system 100 then operates 186 on the data of the current page corresponding to the requested virtual address. The address translation logic 106 continues to monitor for a request for another virtual address translation by determining 188 if there is a request for data in another page. If there is not a request for data in another page, then the computer graphics system 100 continues to operate 186 on the data of the current page. If there is a request for data in another page, then the address translation logic 106 determines 190 if the virtual address for the requested page is in the cache 116.

If the virtual address for the requested page is the same as the predicted virtual address, then the virtual-to-physical address translation is already in the cache 116 because of the pre-fetch operation 184 described above. Accordingly, the address translation logic 106 proceeds to pre-fetch 184 the physical address for the next predicted virtual address. In this way, the address translation logic 106 continues to pre-fetch a virtual address translation for a predicted virtual address each time the address translation logic 106 receives a request for another virtual-to-physical address translation, even if the requested address translation is already in the cache 116.

Alternatively, if the virtual address for the requested page is not in the cache 116, then the address translation logic 106 proceeds to fetch 182 the physical address for the requested virtual address. The pre-fetch prediction method 180 continues in this manner.

Figure 10:
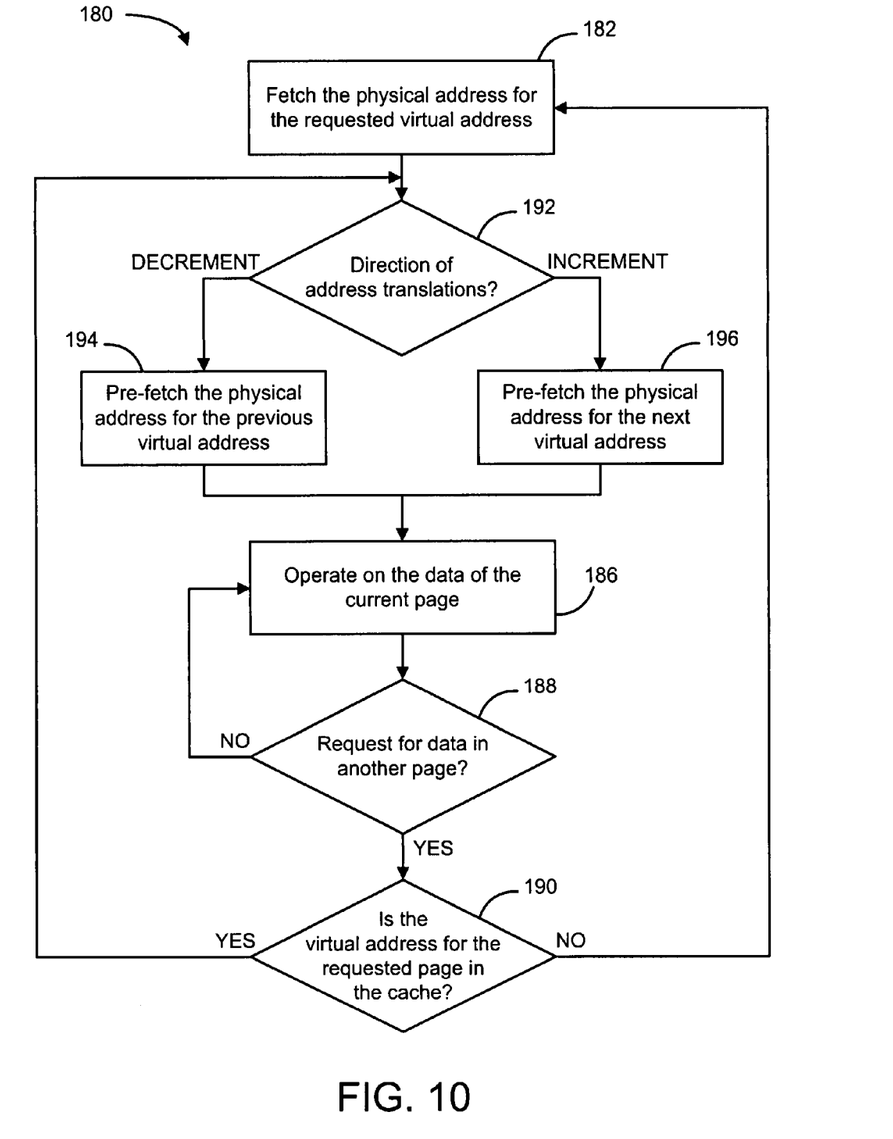
FIG. 10 depicts a schematic flow chart diagram of another embodiment of the pre-fetch prediction method of FIG. 9.

FIG. 10 depicts a schematic flow chart diagram of another embodiment of the pre-fetch prediction method 180 of FIG. 9. For convenience, some of the operations shown in FIG. 10 are the same as operations shown in FIG. 9, and are described above. However, the pre-fetch operation 184 of FIG. 9 is replaced by different operations in FIG. 10. In particular, the embodiment shown in FIG. 10 implements an operation to determine 192 a direction of the address translations. For example, the address prediction logic 118 may determine if the virtual addresses for the requested address translations are incrementing or decrementing. In one embodiment, the address translations only increment in conjunction with execution of a draw primitive or a draw index primitive command. In another embodiment, the address translations either increment or decrement in conjunction with execution of a memory copy command.

If the address prediction logic 118 determines 192 that the address translations are decrementing, then the address pre-fetch logic 120 pre-fetches 194 the physical address for the previous virtual address. Otherwise, if the address prediction logic 118 determines 192 that the address translations are incrementing, then the address pre-fetch logic 120 pre-fetches 196 the physical address for the next virtual address. The illustrated pre-fetch prediction method 180 then continues with the operations described above.

It should be noted that embodiments of the pre-fetch prediction method 180 may be implemented in software, firmware, hardware, or some combination thereof. Additionally, some embodiments of the pre-fetch prediction method 180 may be implemented using a hardware or software representation of one or more algorithms related to the operations described above. For example, software, hardware, or a combination of software and hardware may be implemented to predict a predicted virtual address. In one embodiment, software and/or hardware implementations of the algorithm pre-fetch the virtual-to-physical address translation for the predicted virtual address.

As explained above, embodiments of the system and method described herein provide a way to increase the performance of virtual memory address translations. Additionally, some embodiments improve the performance and reduce the cost of GPU 104. Other embodiments may provide or exhibit other beneficial uses.

Embodiments of the invention also may involve a number functions to be performed by a computer processor such as a central processing unit (CPU), a graphics processing unit (GPU), or a microprocessor. The microprocessor may be a specialized or dedicated microprocessor that is configured to perform particular tasks by executing machine-readable software code from computer readable storage medium that includes memory that defines the particular tasks. The microprocessor also may be configured to operate and communicate with other devices such as direct memory access modules, memory storage devices, Internet related hardware, and other devices that relate to the transmission of data. The software code may be configured using software formats such as Java, C++, XML (Extensible Mark-up Language) and other languages that may be used to define functions that relate to operations of devices required to carry out the functional operations related described herein. The code may be written in different forms and styles, many of which are known to those skilled in the art. Different code formats, code configurations, styles and forms of software programs and other means of configuring code to define the operations of a microprocessor may be implemented.

Within the different types of computers, such as computer servers, that utilize the invention, there exist different types of memory devices for storing and retrieving information while performing some or all of the functions described herein. In some embodiments, the memory/storage device where data is stored may be a separate device that is external to the processor, or may be configured in a monolithic device, where the memory or storage device is located on the same integrated circuit, such as components connected on a single substrate. Cache memory devices are often included in computers for use by the CPU or GPU as a convenient storage location for information that is frequently stored and retrieved. Similarly, a persistent memory is also frequently used with such computers for maintaining information that is frequently retrieved by a central processing unit, but that is not often altered within the persistent memory, unlike the cache memory. Main memory is also usually included for storing and retrieving larger amounts of information such as data and software applications configured to perform certain functions when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. Embodiments may be implemented with various memory and storage devices, as well as any commonly used protocol for storing and retrieving information to and from these memory devices respectively.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system to facilitate virtual page translation, the system including a processor configured to execute software code from a computer readable storage medium, the system comprising:

a processing device to process data of a current block of data;

a front end unit coupled to the processing device, the front end unit configured to access the current block of data in an electronic memory device and to send the current block of data to the processing device for processing;

address translation logic coupled to the front end unit and the electronic memory device, the address translation logic configured to select a predicted virtual address based at least in part on a virtual address of the current block of data, the address translation logic further comprising address prediction logic configured to select the predicted virtual address based at least in part on a type of operation corresponding to the current block of data; and the address translation logic further configured to pre-fetch a virtual-to-physical address translation of the predicted virtual address.

2. The system according to claim 1, the address prediction logic further configured to predict a next sequential virtual address as the predicted virtual address based on a next block of data after the current block of data.

3. The system according to claim 1, the address prediction logic further configured to predict a previous sequential virtual address as the predicted virtual address based on a previous block of data before the current block of data.

4. The system according to claim 1, the address translation logic comprising address pre-fetch logic, the address pre-fetch logic configured to pre-fetch the virtual-to-physical address translation from an address translation source.

5. The system according to claim 4, the address pre-fetch logic further configured to pre-fetch the virtual-to-physical address translation substantially simultaneously with an address translation for the virtual address of the current block of data.

6. The system according to claim 5, the address translation logic further configured to issue a single address translation request to fetch the address translation for the virtual address of the current block of data and to pre-fetch the virtual-to-physical address translation for the predicted virtual address.

7. The system according to claim 4, the address translation source comprising a translation lookaside buffer.

8. The system according to claim 1, the front end unit comprising a cache coupled to the address translation logic, the cache configured to store the virtual-to-physical address translation once it has been pre-fetched.

9. The system according to claim 1, the processor comprising a graphics processing unit.

10. The system according to claim 1, the address translation logic further configured to:

select a plurality of predicted virtual addresses; and pre-fetch a plurality of virtual-to-physical address translations, each translation thereof corresponding to a different predicted virtual address of the plurality of predicted virtual addresses.

11. A method for pre-fetching in connection with virtual page translation for use in a system that includes a processor configured to execute software code from a computer readable storage medium, the method comprising:

receiving a command to process data within a current block of data, the command comprising a virtual address associated with the current block of data;

accessing the current block of data in an electronic memory device;

selecting a predicted virtual address based at least in part on the virtual address of the current block of data and the command used to process the data within the current block of data;

pre-fetching a virtual-to-physical address translation of the predicted virtual address; and storing, after the pre-fetching, the virtual-to-physical address translation.

12. The method according to claim 11, wherein the command comprises a graphical command to manipulate graphical data.

13. The method according to claim 12, the graphical command comprising a memory copy command to move the graphical data from a host memory device to the electronic memory device, the electronic memory device being locally coupled to a graphics processing unit.

14. The method according to claim 12, the graphical command comprising a draw primitive command to draw a plurality of primitive shapes using a plurality of non-shared vertices.

15. The method according to claim 12, the graphical command comprising a draw index primitive command to draw a plurality of primitive shapes using a plurality of shared and non-shared vertices.

16. The method according to claim 11, wherein the selecting further comprises selecting a next sequential virtual address as the predicted virtual address based on a next block of data after the current block of data.

17. The method according to claim 11, wherein the selecting further comprises selecting a previous sequential virtual address as the predicted virtual address based on a previous block of data before the current block of data.

18. The method according to claim 11, wherein:
the selecting further comprises selecting a plurality of predicted virtual addresses; and
the pre-fetching further comprises pre-fetching a plurality of virtual-to-physical address translations, each translation thereof corresponding to a different predicted virtual address of the plurality of predicted virtual addresses.

19. A computer readable storage medium embodying a program of machine-readable instructions, executable by a digital processor, to perform operations to facilitate virtual page translation with pre-fetching, the operations comprising:
receive a command to process data within a current block of data, the command comprising a virtual address associated with the current block of data;
access the current block of data in an electronic memory device;
select, based at least in part on the virtual address of the current block of data and the command used to process the data within the current block of data, a predicted virtual address; and
pre-fetch a virtual-to-physical address translation of the predicted virtual address.

20. The computer readable storage medium of claim 19, wherein the command comprises a graphical command to manipulate graphical data.

21. The computer readable storage medium of claim 19, wherein the select operation further comprises a selection of a next sequential virtual address as the predicted virtual address based on a next block of data after the current block of data.

22. The computer readable storage medium of claim 19, wherein the select operation further comprises selection of a previous sequential virtual address as the predicted virtual address based on a previous block of data before the current block of data.

23. The computer readable storage medium of claim 19, wherein:
the select operation further comprises selection of a plurality of predicted virtual addresses; and
the pre-fetch operation further comprises pre-fetching of a plurality of virtual-to-physical address translations, each translation thereof corresponding to a different predicted virtual address of the plurality of predicted virtual addresses.

* * * * *